(12) United States Patent
Finkler et al.

(10) Patent No.: US 7,457,713 B2
(45) Date of Patent: Nov. 25, 2008

(54) DETERMINATION METHOD FOR A POSITION SIGNAL

(75) Inventors: Roland Finkler, Erlangen (DE); Hans-Georg Köpken, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 11/660,007

(22) PCT Filed: Jul. 28, 2005

(86) PCT No.: PCT/EP2005/053681

§ 371 (c)(1), (2), (4) Date: Feb. 8, 2007

(87) PCT Pub. No.: WO2006/015948

PCT Pub. Date: Feb. 16, 2006

(65) Prior Publication Data

US 2007/0288187 A1 Dec. 13, 2007

(30) Foreign Application Priority Data

Aug. 9, 2004 (DE) .................. 10 2004 038 621

(51) Int. Cl.
*G06F 19/00* (2006.01)
*G21C 17/00* (2006.01)

(52) U.S. Cl. .................. 702/94; 702/189; 702/190; 702/196

(58) Field of Classification Search .............. 702/36, 702/94–97, 150, 151, 158, 163, 189–197; 324/601; 73/1.41, 1.75, 1.79
See application file for complete search history.

(56) References Cited

U.S. PATENT DOCUMENTS 4,446,521 A * 5/1984 Inouye .................. 378/14

(Continued)

FOREIGN PATENT DOCUMENTS

DE 199 14 447 A1 10/1999

(Continued)

OTHER PUBLICATIONS

Berhard Höscheler, "Erhöhung der Genauigkeit bei Wegmeßsystemen durch selbstlemende Kompensation systematischer Fehler", Tagungsband SPS/IPC/Drives, Elektrische Automatisierungstechnik—Systeme und Komponenten, Tradefair and Congress 23.—Nov. 23-25, 1999, Nürnberg, Germany, p. 617-626, XP008056549.

(Continued)

*Primary Examiner*—Eliseo Ramos-Feliciano
*Assistant Examiner*—Phuong Huynh

(57) ABSTRACT

Two sensors scan a measuring scale, which can be displaced in relation to the sensors and comprises a plurality of equidistant measuring gradation, and deliver corresponding measuring signals. The measuring signals are periodic during a uniform relative displacement of the measuring scale, essentially sinusoidal and essentially phase-shifted by 90° in relation to one another. They have an essentially identical amplitude and a base frequency that corresponds to the relative displacement of the measuring scale. During a delivery period of measuring signals, the measuring scale carries out a relative displacement through one measuring gradation. Corrected signals are determined from the measuring signals using correction values. A signal of the position of the measuring scale in relation to the sensors is determined in turn using said correction signals. Fourier coefficients are determined in relation to the base frequency for the corrected signals or for at least one supplementary signal that is derived from the corrected signals, said coefficients being used in turn to update the correction values. Said correction values contain two shift correction values at least one amplitude correction value and at least one phase correction value for the measuring signals, or part of said values, in addition to at least one correction value for at least one higher frequency wave of the measuring signals.

17 Claims, 6 Drawing Sheets

U.S. PATENT DOCUMENTS

| | | | | |
|---|---|---|---|---|
| 6,029,363 | A | * | 2/2000 | Masreliez et al. ............. 33/706 |
| 6,232,595 | B1 | * | 5/2001 | Okamuro et al. ....... 250/231.16 |
| 6,401,052 | B1 | * | 6/2002 | Herb et al. ................. 702/150 |
| 2004/0004471 | A1 | * | 1/2004 | Haas et al. ............... 324/207.2 |
| 2005/0105598 | A1 | * | 5/2005 | Kaewell ..................... 375/147 |

FOREIGN PATENT DOCUMENTS

| | | |
|---|---|---|
| DE | 100 34 733 A1 | 2/2001 |
| DE | 100 41 089 A1 | 3/2002 |
| DE | 100 41 096 A1 | 3/2002 |
| DE | 101 63 504 A1 | 7/2003 |
| DE | 101 63 528 A1 | 7/2003 |
| EP | 1 046 884 A1 | 10/2000 |

OTHER PUBLICATIONS

Bernhard Höscheler and László Számel, "Up-To-Date Technique for Easy High-Accuracy Position Acquisition with Sinusoidal Incremental Encoders", Peridoca Polytechnica Ser. El. Eng., 1998, pp. 337-345, vol. 42, No. 3, XP008056552.

* cited by examiner

FIG 6
$$\cos\varphi_C = x_C/a \qquad \sin\varphi_C = y_C/a$$
FIG 7
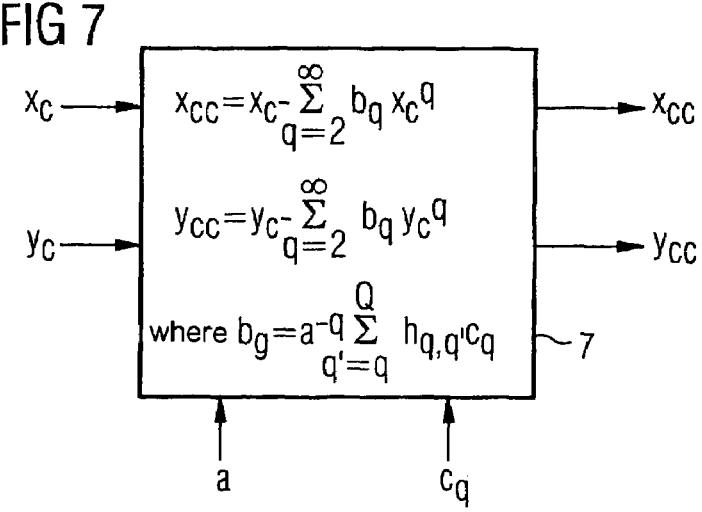
$$x_{cc} = x_c - \sum_{q=2}^{\infty} b_q x_c^q$$
$$y_{cc} = y_c - \sum_{q=2}^{\infty} b_q y_c^q$$
where $b_q = a^{-q} \sum_{q'=q}^{Q} h_{q,q'} c_q$
FIG 8
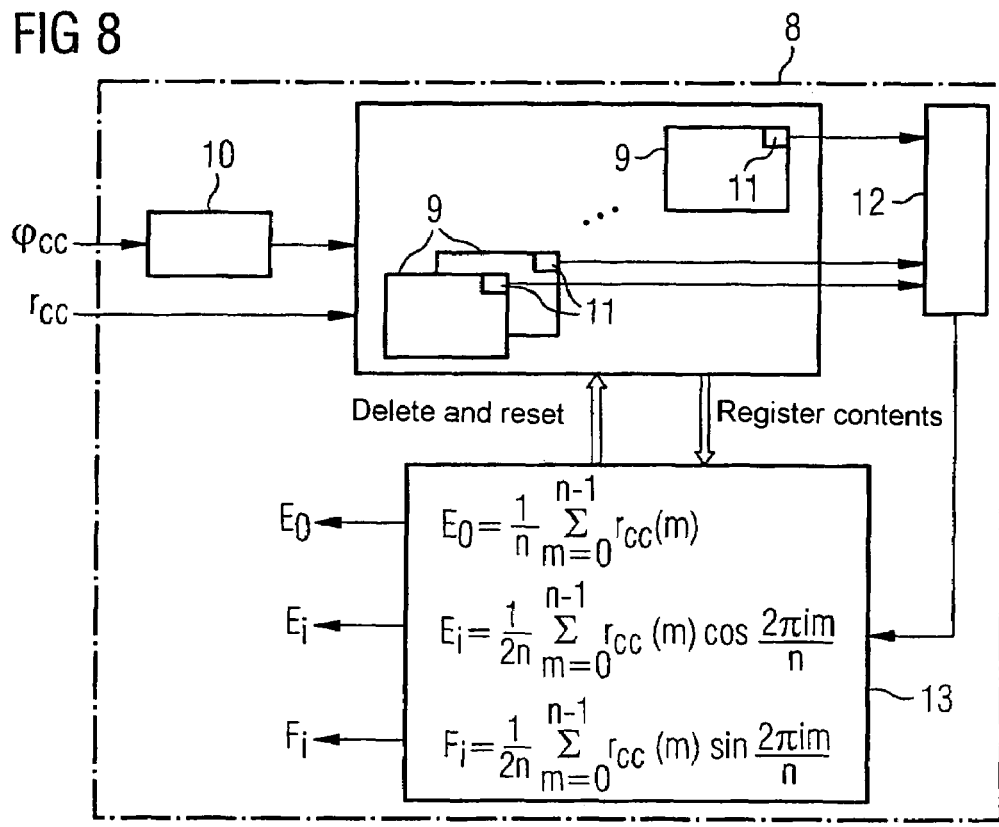
$$E_0 = \frac{1}{n} \sum_{m=0}^{n-1} r_{cc}(m)$$
$$E_i = \frac{1}{2n} \sum_{m=0}^{n-1} r_{cc}(m) \cos \frac{2\pi i m}{n}$$
$$F_i = \frac{1}{2n} \sum_{m=0}^{n-1} r_{cc}(m) \sin \frac{2\pi i m}{n}$$

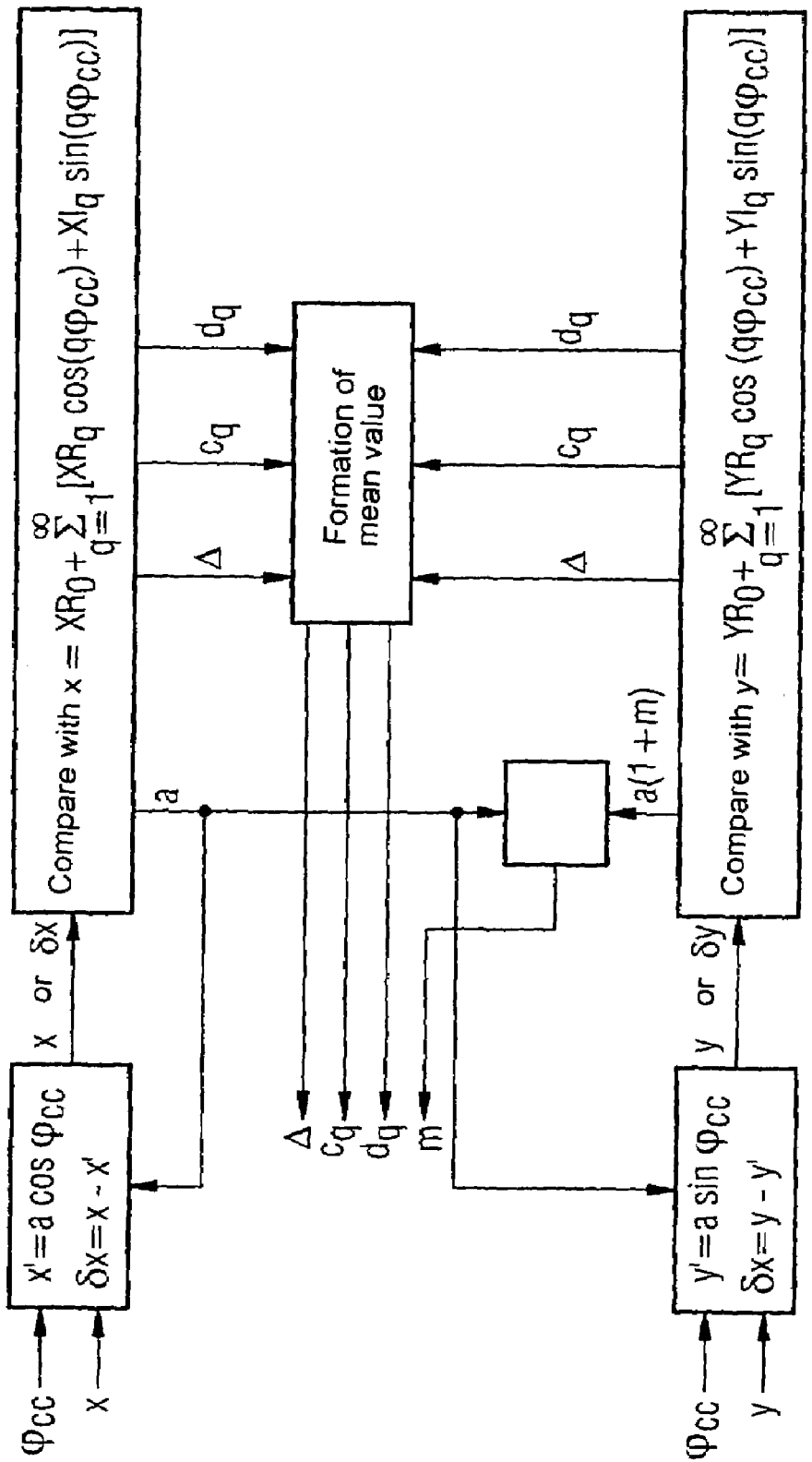

DETERMINATION METHOD FOR A POSITION SIGNAL

CROSS REFERENCE TO RELATED APPLICATIONS

This application is the US National Stage of International Application No. PCT/EP2005/053681, filed Jul. 28, 2005 and claims the benefit thereof. The International Application claims the benefits of German application No. 10 2004 038 621.8 DE filed Aug. 9, 2004, both of the applications are incorporated by reference herein in their entirety.

FIELD OF INVENTION

The present invention relates to a determination method for a position signal, with which two sensors scan a measuring scale which is moveable relative to the sensors, and has a plurality of equally-spaced scale divisions and thereby supply corresponding measuring signals, for a uniform relative movement of the measuring scale the measuring signals are periodic, are essentially sinusoidal, have essentially the same amplitude, have a phase offset relative to one another which is essentially 90°, have a basic frequency which corresponds essentially with the relative movement of the measuring scale, and over the course of one period of the measuring signals the measuring scale executes a relative movement of one scale division, by applying correction values, corrected signals are determined from the measuring signals, using the corrected signals, a position signal of the measuring scale is determined relative to the sensors, for the corrected signals, or for at least one supplementary signal derived from the corrected signals, Fourier coefficients are determined relative to the basic frequency, the correction values are adjusted by reference to the Fourier coefficients, the correction values include two offset correction values, at least one amplitude correction value and at least one phase correction value for the measuring signals or for some of these values.

BACKGROUND OF INVENTION

Determination methods of this type are used in so-called incremental position sensors. With them, the measuring signals are generally referred to as the cosine and sine signals. By evaluation of the passages through zero of the measuring signals, a coarse position is determined—to an accuracy of one signal period. By evaluating in addition the values of the cosine and sine signals themselves, it is possible to determine—within a signal period, a fine position. For ideal measuring signals x, y, this then gives the position signal $\phi$ within the signal period concerned as $$\phi = \arctan(y/x) \text{ if } x > 0 \qquad (1)$$

$$\phi = \arctan(y/x) + \pi \text{ if } x < 0 \qquad (2)$$

$$\phi = \pi/2 \operatorname{sign}(y) \text{ if } x = 0 \qquad (3)$$

In practice, however, the measuring signals x, y are not ideal, but subject to error. With the state of the art, the formulation most commonly adopted for the erroneous measuring signals x, y is $$x = a \cos(\phi + \Delta) + x_0 \qquad (4)$$

$$y = (1+m) a \sin(\phi) = y_0 \qquad (5)$$

Here, $x_0$ and $y_0$ are offset errors in the measuring signals x and y, m is an amplitude error and $\Delta$ is a phase error. a is a signal amplitude. Methods for determining and compensating for these error quantities are generally known.

Thus, for example, a determination method of the type mentioned in the introduction is known from DE-A-101 63 504.

Determination methods for a position signal are known, from DE-A-100 34 733, from DE-A-101 63 528 and from the technical article "Erhöhung der Genauigkeit bei Wegsystemen durch selbstlernende Kompensation systematischer Fehler" [Increasing the precision of position measuring systems by self-learning compensation of systematic errors] by B. Höscheler, conference volume on SPS[PLC]/IPC/DRIVES, Elektrische Automatisierungstechnik—Systeme und Komponenten, Fachmesse und Kongress [Electrical Automation Technology—Systems and Components, Technical Fair and Congress] $23^{rd}$-$25^{th}$ Nov. 1999, Nuremberg, pages 617 to 626, by which:

two sensors scan a measuring scale, which is moveable relative to the sensors and has a plurality of equally-spaced scale divisions, and thereby supply corresponding measuring signals, for a uniform relative movement of the measuring scale the measuring signals are periodic, are essentially sinusoidal, have essentially the same amplitude, have a phase offset relative to one another which is essentially 90°, have a basic frequency which corresponds essentially with the relative movement of the measuring scale, and over the course of one period of the measuring signals the measuring scale executes a relative movement of one scale division, by applying correction values, corrected signals are determined from the measuring signals, using the corrected signals, a position signal of the measuring scale is determined relative to the sensors, the correction values are adjusted, the correction values include two offset correction values, at least one amplitude correction value and at least one phase correction value for the measuring signals.

With the determination method according to DE-A-100 34 733 and the technical article by B. Hoscheler, the position signal is then post-corrected by means of a fine correction method, to compensate for residual errors due to harmonics in the measuring signals. However, the fine correction method described there only works satisfactorily if any changes in speed which occur are sufficiently small.

EP-A-1 046 884 discloses a method for determining a position signal with which two sensors scan a measuring scale, which is moveable relative to the sensors and has a plurality of equally-spaced scale divisions, and thereby supply corresponding measuring signals. For a uniform relative movement of the measuring scale the measuring signals are periodic, have essentially the same amplitude, are essentially sinusoidal, have a phase offset relative to one another which is essentially 90°, and have a basic frequency which corresponds essentially with the relative movement of the measuring scale. Over the course of one period of the measuring signals the measuring scale executes a relative movement of one scale division. The measuring signals are detected with a time displacement relative to one another. For one of the measuring signals, a corrected signal is determined from the measuring signals, using correction values. A position signal of the measuring scale is determined relative to the sensors by reference to the corrected signal and the other, uncorrected signal.

SUMMARY OF INVENTION

An object of the present invention consists in specifying a method which is as simple as possible to carry out, giving as complete a correction as possible of the errors contained in the measuring signals, and which also works properly for larger speed changes.

This object is achieved by a determination method described herein.

The embodiment in accordance with the invention can be further simplified by determining the correction values only for those higher-frequency waves in the measuring signal, the frequency of which is an odd number multiple of the basic frequency. The components which are an even number multiple of the basic frequency are in many cases negligibly small.

The determination method in accordance with the invention can be yet further simplified if the correction values are determined only for those higher-frequency waves in the measuring signal, the frequency of which is three or five times the basic frequency, and the correction values for the higher-frequency waves in the measuring signal, the frequency of which is five times that of the basic frequency, have a predetermined ratio to the correction values for the higher-frequency waves in the measuring signal, the frequency of which is three times that of the basic frequency. In particular it is even possible to determine only the correction values for those higher-frequency waves in the measuring signals, the frequency of which is three times that of the basic frequency, so that the ratio is zero.

Implementation of the determination method in accordance with the invention is particularly simple if for the purpose of determining the Fourier coefficients the corrected signals, or the at least one supplementary signal as applicable, are saved into one of several registers,
an angular range is assigned to each of the registers,
in each case the save is made into the register which has the angular range within which the arctangent for the corrected signal lies, and
the Fourier coefficients are determined by reference to the values saved into the registers.

If the values stored in the registers are deleted after the Fourier coefficients have been determined, and a new determination of the Fourier coefficients is only then undertaken after the resisters have been adequately filled, this results in a particularly robust determination of the correction values.

In the ideal case, the registers are only adequately filled when values have been saved into all the registers in accordance with the method described above. However, it is also possible to regard the registers as adequately filled at the point when values have been saved into a first group of the registers in accordance with the method described above, and in this case a second group of the registers is filled with values which are determined by reference to the values saved in accordance with the method described above.

The evaluation of the values saved into the registers is particularly simple if certain registers are assigned to each Fourier coefficient and the Fourier coefficient concerned is determined by reference exclusively to the values which are saved in the registers assigned to the Fourier coefficient concerned. For appropriate assignment of the registers to the Fourier coefficients, it is then even possible to determine the Fourier coefficients solely by the formation of sums and differences of the values saved in the assigned registers.

The correction of the measuring signals is particularly optimal if for the purpose of determining the corrected signals precorrected signals are first determined,
the pre-corrected signals are determined from the measuring signals, with reference to the offset correction values, to the at least on amplitude correction values and/or to the at least one phase correction value, and
the corrected signals are then determined by reference to the pre-corrected signals and to the at least one correction value for the one or more higher-frequency wave in the measuring signals.

Various approaches are possible for determining the corrected signals from the pre-corrected signals. It is thus possible, for example, to first determine a preliminary arctangent from the pre-corrected signals, and then to determine the corrected signals by applying the preliminary arctangent as the argument in a Fourier series expansion.

It is thus possible to determine the corrected signals by reference to the pre-corrected signals, by the formation of functions of the form $$x_{cc} = x_c - a \sum_{q=2}^{\infty} [c_q \cos(q\varphi_c) + d_q \sin(q\varphi_c)] \quad (6)$$

and $$y_{cc} = y_c - a \sum_{q=2}^{\infty} [c_q \cos(q\varphi_c - q\pi/2) + d_q \sin(q\varphi_c - q\pi/2)] \quad (7)$$

where $x_{cc}$ and $y_{cc}$ are the corrected signals, $x_c$ and $y_c$ the pre-corrected signals, a the signal amplitude, $c_q$ and $d_q$ are weighting factors determined by reference to the Fourier coefficients and $\phi_c$ the preliminary arctangent.

The approach just described can be simplified by replacing the expression $\cos(q\phi_c - q\pi/2)$ by $\cos(q\phi_c)$ for $q=0, 4, 8$, (8)

by $\sin(q\phi_c)$ for $q=1, 5, 9$, (9)

by $-\cos(q\phi_c)$ for $q=2, 6, 10, \ldots$ and (10)

by $-\sin(q\phi_c)$ for $q=3, 7, 11$, (11)

and the expression $\sin(q\phi_c - q\pi/2)$ by $\sin(q\phi_c)$ for $q=0, 4, 8$, (12)

by $-\cos(q\phi_c)$ for $q=1, 5, 9$, (13)

by $-\sin(q\phi_c)$ for $q=2, 6, 10, \ldots$ and (14)

by $\cos(q\phi_c)$ for $q=3, 7, 11$, (15)

It is possible to effect further simplification by replacing the expression $\cos(q\phi_c)$ by the expression $$\sum_{r=0}^{int(q/2)} (-1)^r \binom{q}{2r} (\cos\varphi_c)^{q-2r} (\sin\varphi_c)^{2r} \quad (16)$$

and the expression $\sin(q\phi_c)$ by the expression $$\sum_{r=0}^{int[(q-1)/2]} (-1)^r \binom{q}{2r+1} (\cos\varphi_c)^{q-2r-1} (\sin\varphi_c)^{2r+1} \quad (17)$$

It is even possible to avoid the determination of trigonometric function values, if the expression $\cos(q\phi_c)$ is finally replaced by the expression $x_c/a$ and the expression $\sin(q\phi_c)$ by the expression $y_c/a$.

An alternative possibility consists in determining the corrected signals by reference to the pre-corrected signals, by forming functions of the form $$x_{cc} = x_c - \sum_{q=2}^{\infty} b_q x_c^q \quad (18)$$

and $$y_{cc} = y_c - \sum_{q=2}^{\infty} b_q y_c^q \quad (19)$$

where $x_{cc}$ and $y_{cc}$ are the corrected signals and $x_c$ and $y_c$ the pre-corrected signals, and $b_q$ a weighting factor.

BRIEF DESCRIPTION OF THE DRAWINGS

Further advantages and details are given by the following description of an exemplary embodiment, in conjunction with the drawings. These show, as schematic diagrams:

FIG. 6 a simplification of the approach in FIG. 5,

FIG. 7 a second form of embodiment of the first extract from FIG. 1,

FIG. 8 another extract from the determination circuit in von FIG. 1,

FIG. 13 correction values for the higher-frequency waves in the measuring signals adjusted using Fourier coefficients.

DETAILED DESCRIPTION OF INVENTION

Figure 1:
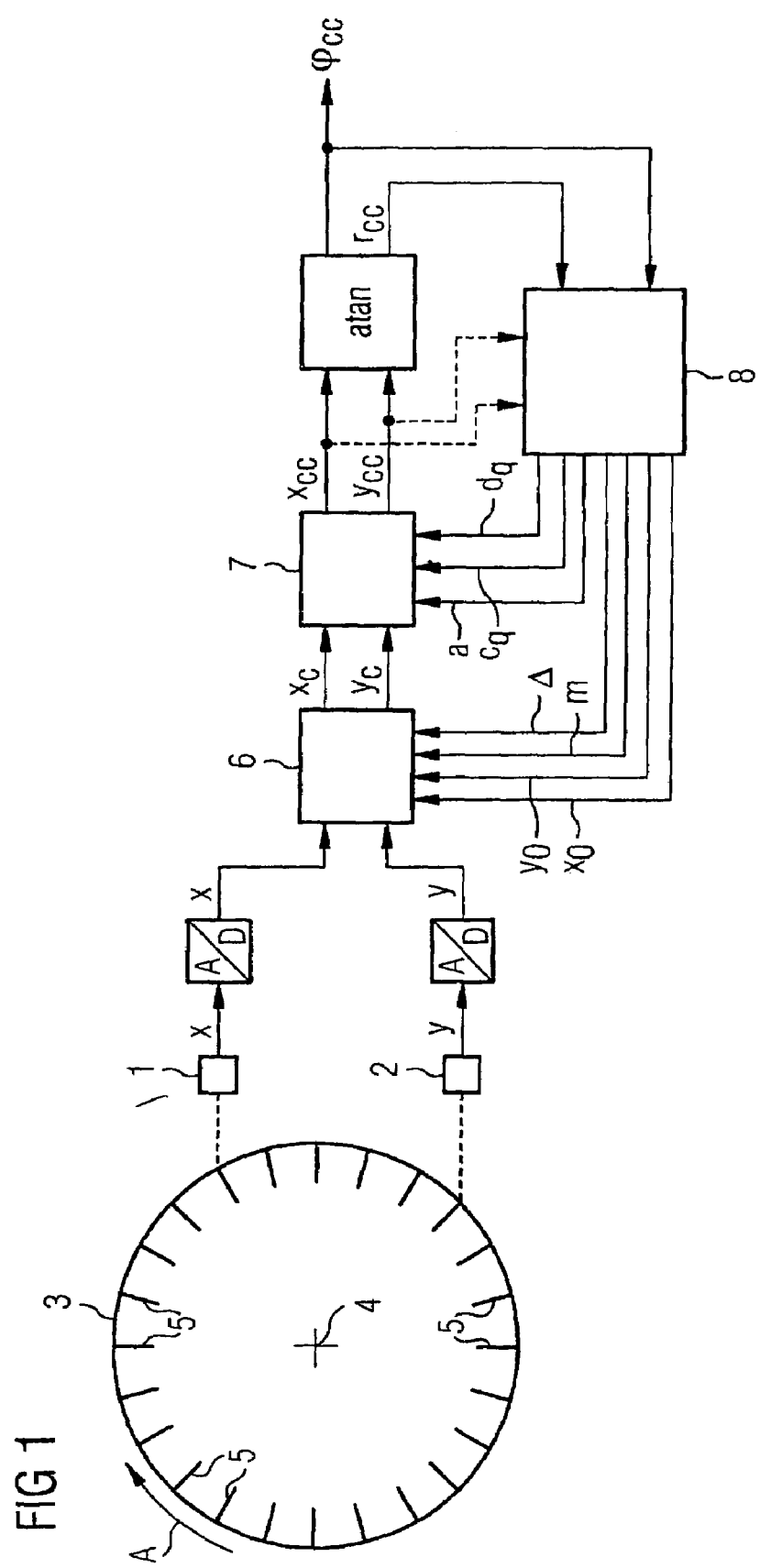
FIG. 1 a block diagram of a determination circuit for a position signal.

As shown in FIG. 1, a determination circuit, by means of which a position signal $\phi_{cc}$ is to be determined, has two sensors 1, 2 and a measuring scale 3. The measuring scale 3 is moveable relative to the sensors 1, 2. As shown in FIG. 1, it can be for example be rotated about an axis of rotation 4. This is indicated in FIG. 1 by an arrow A. The measuring scale 3 has numerous (e.g. 1000 to 5000) equally-spaced scale divisions 5. The sensors 1, 2 scan the measuring scale 3 and thereby supply corresponding measuring signals x, y.

In the ideal case, the sensors 1, 2 have exactly equal sensitivities, and are ideally positioned. For a uniform movement of the measuring scale 3 relative to the sensors 1, 2, the latter are therefore in a position to supply measuring signals x, y which satisfy the following conditions:

They are periodic.
They have an equal amplitude.
They are exactly sinusoidal.
They have a phase offset relative to each other of exactly 90°.
They have a basic frequency fG which corresponds to the relative movement of the measuring scale 3.

One period of the measuring signals x, y then corresponds to a relative movement of one scale division 5 by the measuring scale 3.

In the ideal case therefore, the following applies within one scale division 5:

$$x = a\cos(\phi) \quad (20)$$

$$y = a\sin(\phi) \quad (21)$$

where a is the amplitude of the measuring signals x, y. Correspondingly, the following applies for the position signal $\phi$ of the measuring scale 3 within a scale division 5:

$$\phi = \arctan(y/x) \text{ when } x>0 \quad (22)$$

$$\phi = \arctan(y/x) + \pi \text{ when } x<0 \quad (23)$$

$$\phi = (\pi/2)\text{sign}(y) \text{ when } x=0 \quad (24)$$

In a real situation however, the sensors 1, 2 are not exactly positioned and they also have sensitivities which are—at least slightly—different. In the real situation therefore, for a uniform relative movement of the measuring scale 3 the measuring signals x, y have amplitudes which are only broadly the same, are only broadly sinusoidal in shape and only broadly have a phase offset of 90° relative to each other. On the other hand, the basic frequency fG of the measuring signals x, y is retained.

The following formulation can therefore be made for the measuring signals x, y as a function of the actual position $\phi$ of the measuring scale 3 within a scale division 5:

$$x = a\,c(\phi+\Delta)+x_0 \quad (25)$$

$$y = (1+m)\,a\,s(\phi)+y_0 \quad (26)$$

where c and s are periodic functions of the form $$c(\phi) = \cos(\phi) + \sum_{q=2}^{\infty} [c_q \cos(q\phi) + d_q \sin(q\phi)] \quad (27)$$

and $$s(\phi) = \sin(\phi) + \sum_{q=2}^{\infty} [c_q \cos(q\phi - q\pi/2) + d_q \sin(q\phi - q\pi/2)] \quad (28)$$

The functions c and s are phase-shifted relative to one another by 90° or $\pi/2$, as applicable. Hence $s(\phi) = c(\phi - \pi/2)$ applies.

In the above formulae, $x_0$ and $y_0$ represent offset errors, m an amplitude error and $\Delta$ a phase error. $c_q$ and $d_q$ are tracking signal distortions due to harmonics of the basic frequency fG, that is distortions caused by higher-frequency waves in the measuring signals x, y. The following applies as a general rule $$|x_0/a|, |y_0/a|, |m|, |2\Delta/\pi|, |c_q|, |d_q| \ll 1. \quad (29)$$

These signal errors must be determined and compensated for.

The method in accordance with the invention is executed iteratively. It is now assumed below that values have already been determined for the signal errors $x_0, y_0, m, \Delta, c_q, d_q$. At the start of the method, however, the value can be set to predetermined starting values, e.g. to $x_0=y_0=m=\Delta=c_q=d_q=0$.

Figure 2:
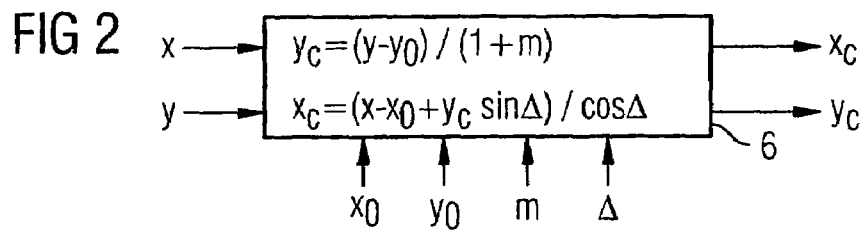
FIG. 2 a first form of embodiment of a first extract from FIG. 1.

The measuring signals x, y detected by the sensors 1, 2 are initially fed to a first correction block 6, as shown in FIG. 1. Also fed to the correction block 6 are the correction values $x_0$, $y_0$, m and $\Delta$ for the offset, amplitude and phase errors. The first correction block 6 determines from these—see FIG. 2—pre-corrected signals $x_c$, $y_c$ in accordance with the ratios $$y_c=(y-y_0)/(1+m) \tag{30}$$

$$x_c=(x-x_0+y_c \sin \Delta)/\cos(\Delta) \tag{31}$$

For the pre-corrected signals $x_c$, $y_c$, the following approximations apply $$x_c \approx a \cos(\phi)+a\Sigma_{q=2}^{\infty}[c_q \cos(q\phi)+d_q \sin(q\phi)] \tag{32}$$

$$y_c \approx a \sin(\phi)+a\Sigma_{q=2}^{\infty}[c_q \cos(q\phi-q\pi/2)+d_q \sin(q\phi-q\pi/2)] \tag{33}$$

Using the pre-corrected signals $x_c$, $y_c$ and the correction values $c_q$, $d_q$ for the higher-frequency waves in the measuring signals x, y, it is then possible in a second correction block 7 to determine corrected signals $x_{cc}$, $y_{cc}$, in doing which the tracking signal distortions are also largely compensated.

There are several possibilities for determining the corrected signals $x_{cc}$, $y_{cc}$.

Figure 3:
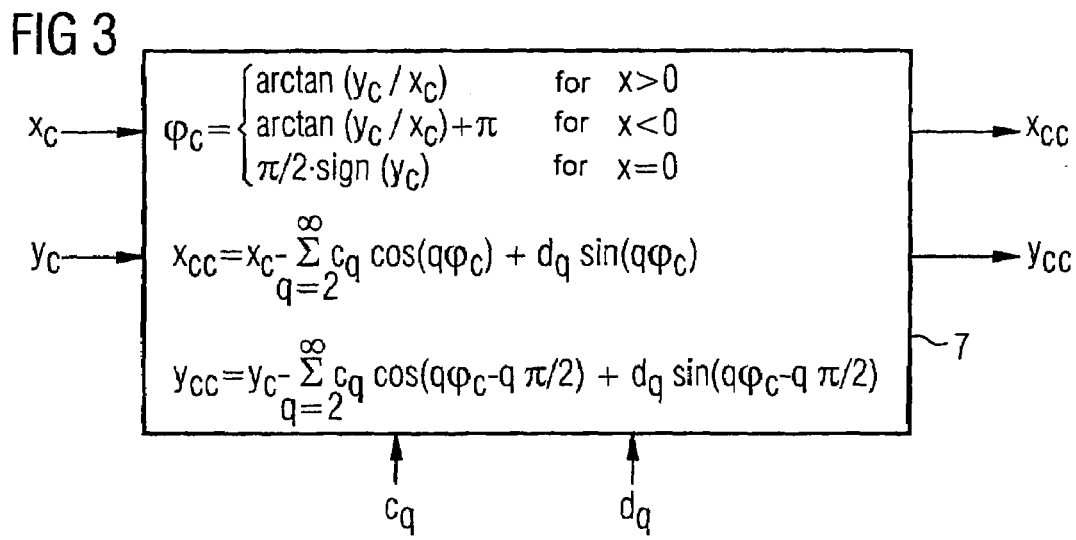
FIG. 3 a first form of embodiment of a second extract from von FIG. 1.

For example, using the pre-corrected signals $x_c$, $y_c$ it is possible—see FIG. 3—to determine first a preliminary arctangent $\phi_c$ from the ratios $$\phi_c=\arctan(y_c/x_c) \text{ when } x_c>0 \tag{34}$$

$$\phi_c=\arctan(y_c/x_c)+\pi \text{ when } x_c<0 \tag{35}$$

$$\phi_c=(\pi/2)\text{sign}(y_c) \text{ when } x_c=0 \tag{36}$$

and thence to determine the corrected signals $x_{cc}$, $y_{cc}$ by utilizing the preliminary arctangent $\phi_c$ as the argument in a Fourier series expansion. The corrected signals $x_{cc}$, $y_{cc}$ are then formed in this case, for example, by forming functions of the form $$x_{cc}=x_c-a\Sigma_{q=2}^{\infty}[c_q \cos(q\phi_c)+d_q \sin(q\phi_c)] \tag{37}$$

$$y_{cc}=y_c-a\Sigma_{q=2}^{\infty}[c_q \cos(q\phi_c-q\pi/2)+d_q \sin(q\phi_c-q\pi/2)] \tag{38}$$

For the corrected signals $x_{cc}$, $y_{cc}$ determined in this way, it is then true to a very good approximation that $$x_{cc}=a \cos(\phi) \tag{39}$$

$$y_{cc}=a \sin(\phi) \tag{40}$$

By analogy with the formulae 1 to 3 it is thus possible, using the measuring signals x, y and the correction values $x_0$, $y_0$, m, $\Delta$, $c_q$, $d_q$, to determine with great accuracy an arctangent $\phi_{cc}$, and hence also the position $\phi_{cc}$ of the measuring scale 3 within a scale division 5. That is to say, using the corrected signals $x_{cc}$, $y_{cc}$ it is possible to determine the position signal $\phi_{cc}$ for the measuring scale 3 relative to the sensors 1, 2, by using the equations $$\phi_{cc}=\arctan(y_{cc}/x_{cc}) \text{ when } x_{cc}>0 \tag{41}$$

$$\phi_{cc}=\arctan(y_{cc}/x_{cc})+\pi \text{ when } x_{cc}<0 \tag{42}$$

$$\phi_{cc}=(\pi/2)\text{sign}(y_{cc}) \text{ when } x_{cc}=0 \tag{43}$$

It should be remarked at this point that for the purpose of determining the complete position of the measuring scale 3 it is also necessary to know which scale graduation 5 has just been sensed by the sensors 1, 2 (the so-called coarse position). However, it is generally known how to determine this coarse position, and this is not a subject of the present invention. Rather, within the context of the present invention it is taken as given.

Figure 4:
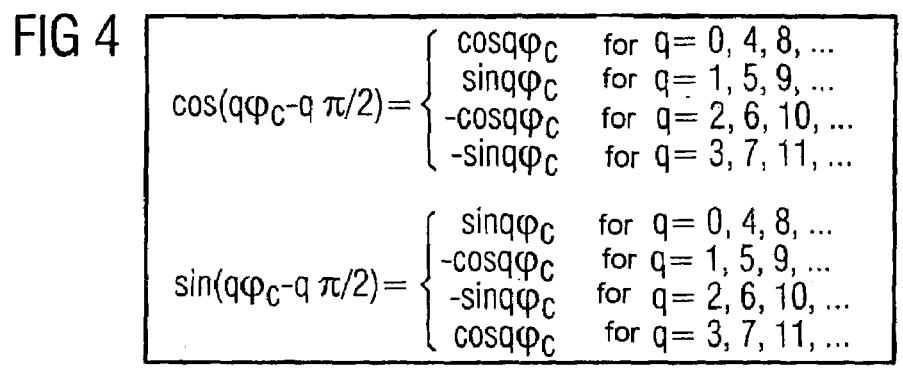
FIG. 4 a simplification of the approach in FIG. 3.

Formulae 37 and 38 are mathematically correct, but require a large computational effort because sine and cosine values must be determined both for $q\phi_c$ and for $(q\phi_c-q\pi/2)$. For this reason, in accordance with the generally familiar addition theorems for sine and cosine the following substitutions—see FIG. 4—are made:

The expression $\cos(q\phi_c-q\pi/2)$ is replaced by $\cos(q\phi_c)$ for $q=0, 4, 8,$ (44)

by $\sin(q\phi_c)$ for $q=1, 5, 9,$ (45)

by $-\cos(q\phi_c)$ for $q=2, 6, 10, \ldots$ and (46)

by $-\sin(q\phi_c)$ for $q=3, 7, 11,$ (47)

In addition, the expression $\sin(q\phi_c-q\pi/2)$ is replaced by $\sin(q\phi_c)$ for $q=0, 4, 8,$ (48)

by $-\cos(q\phi_c)$ for $q=1, 5, 9,$ (49)

by $-\sin(q\phi_c)$ for $q=2, 6, 10, \ldots$ and (50)

by $\cos(q\phi_c)$ for $q=3, 7, 11,$ (51)

After this it only remains necessary to determine the sine and cosine values of $q\phi_c$.

Figure 5:
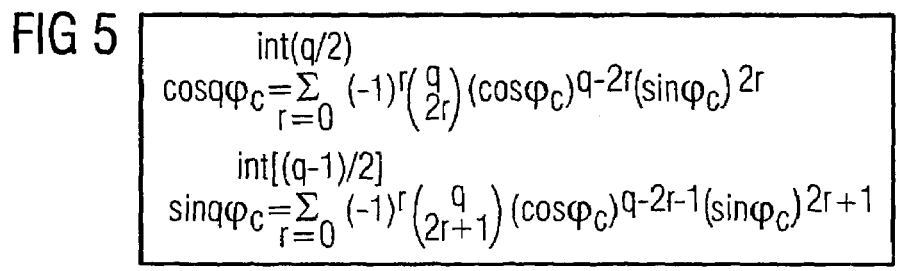
FIG. 5 a simplification of the approach in FIG. 4.

Formula 37, and the modified formula 38 which is arrived at by modification in accordance with the formulae 44 to 51, can however be yet further simplified. Because it is possible, as shown in FIG. 5, to replace the expression $\cos(q\phi_c)$ in these formulae by the expression $$\sum_{r=0}^{int(q/2)} (-1)^r \binom{q}{2r}(\cos\varphi_c)^{q-2r}(\sin\varphi_c)^{2r} \tag{52}$$

Furthermore, the expression $\sin(q\phi_c)$ can be replaced by the expression $$\sum_{r=0}^{int[(q-1)/2]} (-1)^r \binom{q}{2r+1}(\cos\varphi_c)^{q-2r-1}(\sin\varphi_c)^{2r+1} \tag{53}$$

After this it only remains necessary to determine the sine and cosine of $\phi_c$.

However, even the determination of these trigonometric functions can be avoided. Because it is possible—see FIG. 6—to replace the expression $\cos(\phi_c)$ by the expression $x_c/a$ and the expression $\sin(\phi_c)$ by the expression $y_c/a$.

In many case, the measuring signals x, y arise from a mapping of the signals $$x_{cos}=a \cos(\phi+\Delta)+x_0 \tag{54}$$

$$y_{cos}=(1+m) a \sin(\phi)+y_0 \tag{55}$$

by means of a (common) non-linear characteristic curve f.

The following then applies $$x = f(x_{cos}) \tag{56}$$

$$y = f(y_{cos}) \tag{57}$$

In this case, the correction values $d_q$ vanish, that is they have a value of zero. In this case it is therefore possible—see FIG. 7—to determine the corrected signals $x_{cc}$, $y_{cc}$ using the pre-corrected signals $x_c$, $y_c$ by forming functions of the form $$x_{cc} = x_c - \Sigma_{q=2}^{\infty} b_q x_c^q \tag{58}$$

$$y_{cc} = y_c - \Sigma_{q=2}^{\infty} b_q y_c^q \tag{59}$$

Here, the coefficients bq are determined by the ratio $$b_q = a^{-1} \Sigma_{q'=q}^{Q} h_{q,q'} c_{q'} \tag{60}$$

where $h_{q,q'}$ are matrix coefficients. Here, the matrix coefficients $h_{q,q'}$ can be determined as follows:

For the sake of simplicity and with no loss of generality, the assumption is initially made in what follows that the correction values $x_0$, $y_0$, m and $\Delta$ are zero.

We now assume further that the non-linear function f can be expanded as a Taylor series and the Taylor coefficients of the function f correspond to the coefficients $b_q$ and that $|bq| << 1$. Then the measuring signal x resulting from a position $\phi$ is given by $$x = \Sigma_{q=0}^{\infty} b_q a^q [\cos(\phi)]^q \tag{61}$$

Using the ratio $$\cos(\beta) = \sum_{r=0}^{int(q/2)} (-1)^r \binom{q}{2r} (\cos\beta)^{q-2r} (\sin\beta)^{2r} \tag{62}$$

which applies for any angle $\beta$, and the ratio $(\cos\beta)^2 + (\sin\beta)^2 = 1$ which is also generally valid, it is however possible to determine coefficients $g_{q,r}$ such that $$[\cos(\phi)]^q = \Sigma_{r=0}^{q} g_{q,r} \cos(r\phi) \tag{63}$$

The coefficients $g_{q,r}$ are independent of $\beta$ or $\phi$, as applicable. The first coefficients $g_{q,r}$ turn out as $g_{0,0}=1$, $g_{1,0}=0$, $g_{1,1}=1$, $g_{2,0}=½$, $g_{2,1}=0$, $g_{2,2}=-½$, $g_{3,0}=0$, $g_{3,1}=¾ g_{3,2}=0$, $g_{3,3}=¼$. This allows equation 61 to be rewritten as $$x = \Sigma_{q=0}^{\infty} b_q a^q \Sigma_{r=0}^{q} g_{q,r} \cos(r\phi) = \Sigma_{q=0}^{\infty} c_q \cos(q\phi) \tag{64}$$

where $$c_q = \Sigma_{q'=q}^{\infty} b_{q'} a^{q'} g_{q',q} \tag{65}$$

In practice, it is only necessary to consider a finite number of the coefficients bq. The others can to a good approximation be assumed to be zero. As a result, the system of equations in equation 65 is reduced to a finite system of equations, which for known correction values cq can be solved for the coefficients bq. The trigger produces a system of equations in the form of equation 60. The matrix coefficients hq,q' can thus be determined by a comparison of coefficients. In this way one obtains, for example, h0,0=1, h0,1=0, h1,1=1, h0,2=−1, h1,2=0, h2,2=2, h0,3=0, h1,3=−3, h2,3=0, h3,3=4.

For the purpose of compensating for the errors in the measuring signals x, y, arising from the non-linear function f, one can simply subject the pre-corrected signals $x_c$, $y_c$ to an inverse mapping. For small errors, that is to say for $|c_q| << 1$, this inverse mapping is given approximately by $$x_{cc} = x_c - \Sigma_{q=2}^{\infty} b_q x_c^q \tag{66}$$

$$y_{cc} = y_c - \Sigma_{q=2}^{\infty} b_q y_c^q \tag{67}$$

The above assumes throughout that the correction values $x_0$, $y_0$, m, $\Delta$, $c_q$, $d_q$ are known, and thus it is possible to effect the compensation. However, the correction values $x_0$, $y_0$, m, $\Delta$, $c_q$, $d_q$ must also be determined. For this purpose, we proceed according to FIG. 1, as follows:

For each position $\phi_{cc}$ which is determined, the sum of the squares of the corrected signals $x_{cc}$, $y_{cc}$, or the square root of this sum, is also determined as applicable. That is, from the corrected signals $x_{cc}$, $y_{cc}$ is derived a supplementary signal $r^{cc2}$ or $r_{cc}$ as applicable, in the form $$r_{cc}^2 = x_{cc}^2 + y_{cc}^2 \text{ and } r_{cc} = \sqrt{x_{cc}^2 + y_{cc}^2} \tag{68}$$

In what follows, only the approach for a supplementary signal $r_{cc}$ is considered. The approach for the supplementary signal $r_{cc}^2$ is completely analogous.

The supplementary signal $r_{cc}$ and the position $\phi_{cc}$ are fed into a Fourier block 8—see FIGS. 1 and 8. As shown in FIG. 8, the Fourier block 8 has a number of registers 9. The supplementary signal $r_{cc}$ which is instantaneously being fed in is saved into one of these registers 9.

Figure 9:
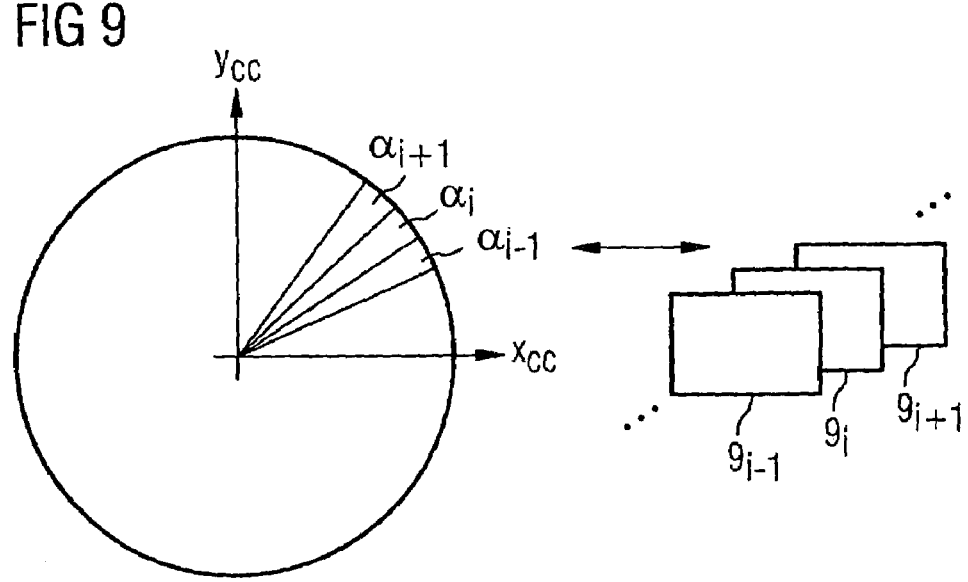
FIG. 9 an assignment of angular ranges to registers.

As shown in FIG. 9, an angular range, $\alpha 1$ to $\alpha n$, is assigned to each of the registers 9, where n is preferably a power of 2. The Fourier block 9 then has a selector 10. The position signal $\phi_{cc}$ is fed to the selector 10. By reference to the position signal $\phi_{cc}$, the selector 10 activates that register 9 for which the position signal $\phi_{cc}$ lies within its assigned angular range $\alpha 1$ to $\alpha n$, in order to save the supplementary signal $r_{cc}$ concerned into this register 9.

In addition, a flag 11 is assigned to each register 9. As well as saving away the supplementary signal $r_{cc}$ into one of the registers 9, the selector 10 at the same time also sets the flag 11 which is assigned to the register 9 concerned.

The flags 11 are linked to a trigger element 12. By reference to the flags 11, the trigger element 12 determines whether a trigger condition is satisfied. If the trigger condition is not satisfied, the trigger element 12 does not activate a computational block 13. On the other hand, if the trigger condition is satisfied, it activates the computational block 13. So a determination of the Fourier coefficients $E_i$, $F_i$ is only undertaken if the trigger condition is satisfied.

If the trigger condition is satisfied, the computational block 13 determines the Fourier coefficients $E_i$, $F_i$ for the supplementary signal $r_{cc}$ by reference to the totality of the values saved in the registers 9. It thus determines the Fourier coefficients $E_i$, $F_i$ in such a way that the following applies $$r_{cc} = E_0 + \Sigma_{i=1}^{\infty} [E_i \cos(i\phi) + F_i \sin(i\phi)] \tag{69}$$

After the determination of the Fourier coefficients $E_i$, $F_i$, the computational block 13 resets the flags 11 again. Furthermore, it also clears the values saved in the registers 9. A re-determination of the Fourier coefficients $E_i$, $F_i$ will thus not take place again until the trigger condition is again satisfied.

In the simplest case, the trigger condition is only satisfied when values have been saved into all the registers 9 in accordance with the method described above. In this case, it is only necessary to check whether all the flags 11 have been set.

Figure 10:
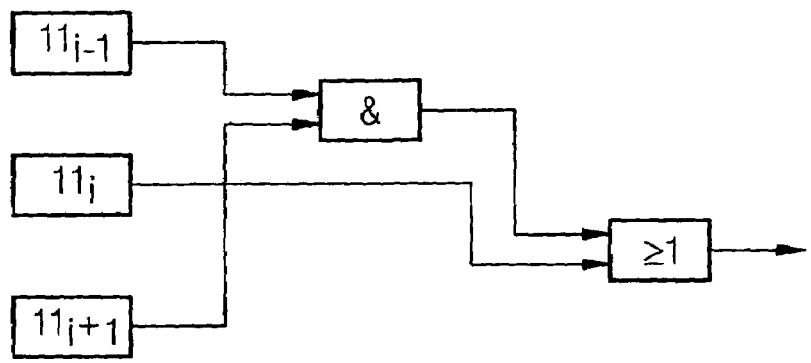
FIG. 10 a logical combination.

However, it is also possible for the trigger condition to be satisfied when values have been saved into only a first group of the registers 9 in accordance with the method described above. For example, it may be assumed that there is an adequate filling of the registers 9 if it is true for each register 9 that its assigned flag is set and/or the flags 11 assigned to both the immediately neighboring registers 9 are set. This can be determined—for each register 9 individually—by means of a logical combination, an example of which is shown in FIG. 10. In particular, in this case the remaining registers 9 can be filled with values which are determined by reference to the values already saved. For example, into each register 9, in which a value has not yet been saved in accordance with the above method, could be saved the mean of the two values which have been saved into the two registers 9 which are immediately neighboring in terms of angle.

Figure 11:
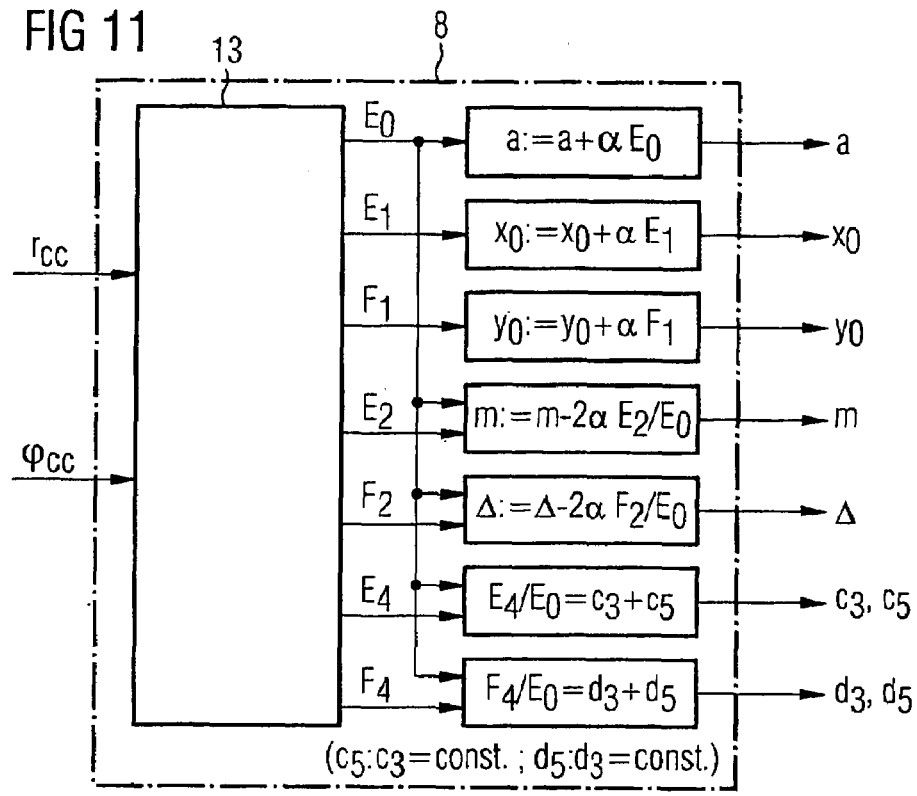
FIG. 11 a first approach for determining the correction values.
Figure 12:
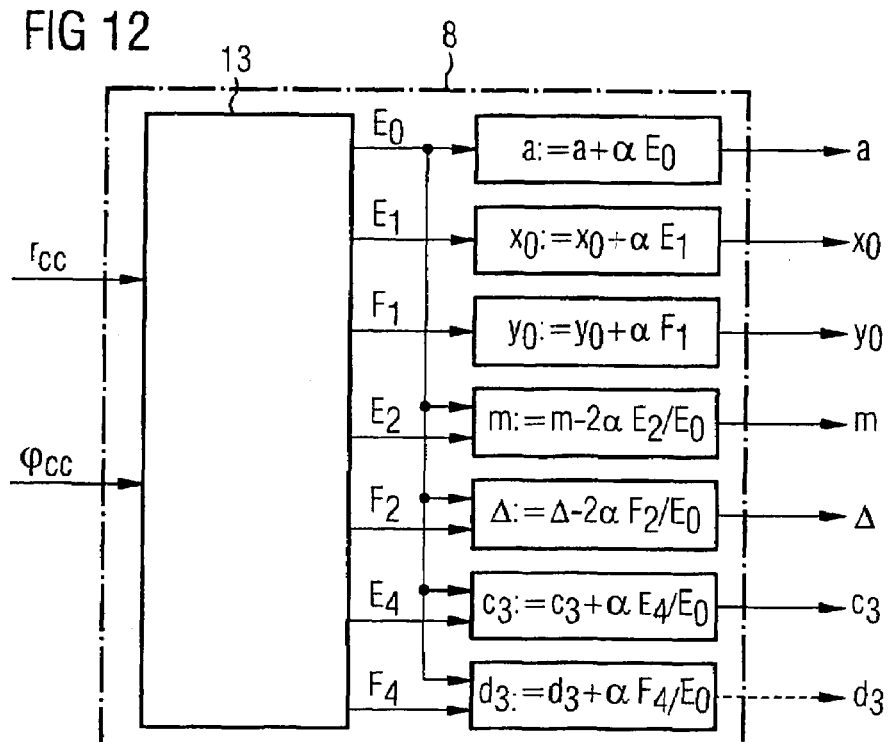
FIG. 12 an alternative approach for determining the correction values.

The computational block 13 thus determines—see FIGS. 11 and 12—the Fourier coefficients $E_i$ (i=0, 1, ...) and $F_i$ (i=1, 2, ...) in a manner known per se. In principle, the Fourier coefficients $E_i$, $F_i$ are thus determined in the computational block 13 in accordance with the usual approach. For example, they can be determined in accordance with the formulae $$E_0 = (1/n)\Sigma_{m=0}^{n-1} r_{cc}(m) \tag{70}$$

$$E_i = [(1/(2n)]\Sigma_{m=0}^{n-1} r_{cc}(m)\cos(2\pi i m/n) \tag{71}$$

$$F_i = [(1/(2n)]\Sigma_{m=0}^{n-1} r_{cc}(m)\sin(2\pi i m/n) \tag{72}$$

Preferably, however, certain registers 9 are assigned to each of the Fourier coefficients $E_i$, $F_i$. These registers 9 can, in particular, be those of the registers 9 for which the contribution, of the value saved in the register 9 concerned to the Fourier coefficients $E_i$, $F_i$ concerned, is particularly heavily weighted, i.e. the value of $\cos(2\pi i m/n)$ or $\sin(2\pi i m/n)$ lies close to one. The computational effort can then be significantly reduced without any essential change in the value determined for the Fourier coefficients $E_i$, $F_i$. It is thus possible to determine the Fourier coefficients $E_i$, $F_i$ concerned exclusively by reference to the values which are saved in the registers 9 assigned to the Fourier coefficients $E_i$, $F_i$. The registers 9 which are assigned to the Fourier coefficients $E_i$, $F_i$ concerned are here obviously determined individually for each Fourier coefficient $E_i$, $F_i$.

The approach just outlined can even be extended to the point that the only registers 9 assigned to each Fourier coefficient $E_i$, $F_i$ are those for which the cosine or sine, as applicable, assumes the maximum absolute value. In this case it is possible to determine the Fourier coefficients $E_i$, $F_i$ exclusively by the formation of sums and differences of the values saved in the assigned registers 9.

As can be seen from FIGS. 11 and 12, the offset correction values $x_0$, $y_0$ are determined from the Fourier coefficients $E_1$, $F_1$ for the basic frequency component of the supplementary signal $r_{cc}$. The amplitude correction value m and the phase correction value $\Delta$ are determined from the Fourier coefficients $E_2$, $F_2$ for the first harmonic component in the supplementary signal $r_{cc}$. Because, for small error variables $x_0$, $y_0$, m, $\Delta$ the following applies to a very good approximation $$E_0 = a \tag{73}$$

$$E_1 = x_0 + (a/2)c_2 - (a/2)d_2 \tag{74}$$

$$F_1 = y_0 + (a/2)c_2 + (a/2)d_2 \tag{75}$$

$$E_2 = -(a/2)m \tag{76}$$

$$F_2 = -(a/2)\Delta \tag{77}$$

Under the realistic assumption that the correction values $c_2$, $d_2$ vanish or are negligibly small relative to the offsets $x_0$, $y_0$, these equations thus give uniquely the base correction values (i.e. the offset, amplitude and phase correction values) $x_0$, $y_0$, m and $\Delta$.

On the other hand, for higher-frequency waves in the measuring signals x, y, the assignment of the Fourier coefficients $E_i$, $F_i$ to the correction values $c_q$, $d_q$ are ambiguous. Because for n=0, 1, 2, ... it is approximately true that $$E_{3+4n} = (a/2)(c_{2+4n} + d_{2+4n} + c_{4+4n} + d_{4+4n}) \tag{78}$$

$$F_{3+4n} = (a/2)(-c_{2+4n} + d_{2+4n} - c_{4+4n} + d_{4+4n}) \tag{79}$$

$$E_{4+4n} = a(c_{3+4n} + c_{5+4n}) \tag{80}$$

$$F_{4+4n} = a(d_{3+4n} + d_{5+4n}) \tag{81}$$

$$E_{5+4n} = (a/2)(c_{4+4n} - d_{4+4n} + c_{6+4n} - d_{6+4n}) \tag{82}$$

$$F_{5+4n} = (a/2)(c_{4+4n} + d_{4+4n} + c_{6+4n} + d_{6+4n}) \tag{83}$$

These ambiguities can be resolved in various ways.

Namely, the above system of equations has been derived using first partial derivatives. It is therefore possible, for example, to take into account also higher order derivatives, and thus to arrive at further ratios between the Fourier coefficients $E_i$, $F_i$ on the one hand, and the correction values $c_q$, $d_q$ on the other hand. The ambiguity could possibly be eliminated in this way. However, this approach requires a very high computational effort. Also, the resulting system of equations is generally no longer analytically soluble, but only numerically.

In practice, however, one can often make simplifying assumptions, on the basis of which the assignment of the Fourier coefficients $E_i$, $F_i$ to the correction values $c_q$, $d_q$ becomes unambiguous.

A first possible assumption is that in the measuring signals x, y the higher-frequency waves which arise are essentially only those with a frequency which is an odd number multiple of the basic frequency fG. The result of this assumption, which is most cases is perfectly applicable, is that only equations 80 and 81 must be solved. So, it is only necessary to determine the correction values $c_q$, $d_q$ for the at least one higher-frequency waves, in the measuring signals x, y, the frequency of which is an odd integral multiple of the basic frequency fG of the corrected signals $x_{cc}$, $y_{cc}$.

It can also be assumed without major error that the only relevant higher-frequency waves in the measuring signal x,y are those with a frequency of three, and possibly also five times the basic frequency fG of the corrected signals $x_{cc}$, $y_{cc}$. It is therefore sufficient to solve equations 80 and 81 for n=0, and thus to determine the correction values $c_3$, $d_3$, $c_5$, $d_5$. For this purpose there are two alternative possibilities, which are shown in FIGS. 11 and 12.

On the one hand it can be assumed—see FIG. 11—that the correction values $c_5$, $d_5$ have a predetermined ratio to the correction values $c_3$, $d_3$. For example, it is assumed that the correction values $c_3$ and $c_5$ are in the ratio 3:1, that is the correction value $c_3$ is always three times as large as the correction value $c_5$. Other (even negative) ratios are however also conceivable. With this assumption, the correction values $c_3$ and $c_5$ can be determined uniquely from equation 80. For the correction values $d_3$ and $d_5$, either the same assumption can be made or a different one.

Alternatively it can also be assumed—so to speak as a special case of this approach—that the harmonic wave with a frequency five times that of the basic frequency fG of the corrected signals $x_{cc}$, $y_{cc}$ vanishes, that is the correction values $c_5$ and $d_5$ have a value of zero. In this case it is only necessary to determine the correction values $c_3$, $d_3$ for those higher-frequency waves in the measuring signals x, y with a frequency which is three times the basic frequency fG. Then in this case, for example, $c_3 = E_4/E_0$. This approach is shown in FIG. 12.

Depending on the situation, it can indeed be logical in an individual case to assume that both the correction values $d_3$ and $d_5$ and also the correction value $c_5$ vanish, i.e. have a value of zero.

Using the Fourier coefficients $E_i$, $F_i$ it is then possible to adjust the correction values $x_0$, $y_0$, $m$, $\Delta$, $c_q$, $d_q$. For example, in the case where correction values $c_3$, $d_3$ are determined only for the third harmonic, the following adjustment rules can be executed:

$$a := a + \alpha E_0 \tag{84}$$

$$x_0 := x_0 + \alpha E_1 \tag{85}$$

$$y_0 := y_0 + \alpha F_1 \tag{86}$$

$$m := m - 2\alpha E_2/E_0 \tag{87}$$

$$\Delta := \Delta - 2\alpha F_2/E_0 \tag{88}$$

$$c_3 := c_3 + \alpha E_4/E_0 \tag{89}$$

$$d_3 := d_3 + \alpha F_4/E_0 \tag{90}$$

Here, the factor $\alpha$ is a positive number which is less than one. It is preferably the same for all the adjusted values $a$, $x_0$, $y_0$, $m$, $\Delta$, $c_3$, $d_3$. However, it can also be defined separately for each individual value which is adjusted, $a$, $x_0$, $y_0$, $m$, $\Delta$, $c_3$, $d_3$.

The above is a description of the fact that, and how, the correction values $x_0$, $y_0$, $m$, $\Delta$, $c_3$, $d_3$ have been determined using a supplementary signal $r_{cc}$. Here, the supplementary signal $r_{cc}$ (or $r_{cc}^2$ as applicable) corresponded respectively to the sum of the squares of the corrected signals $x_{cc}$, $y_{cc}$, or the square root of this sum.

By means of the approach in accordance with the invention it is thus also possible to correct higher-frequency waves in the measuring signals $x$, $y$ in a simple manner. This is indicated in FIG. 1 by dashed lines. In this case, the equations $$x_{cc} = x_0 + a\cos(\phi_{cc}+\Delta) + a\Sigma_{q=2}^{\infty}[c_q \cos(q\phi_{cc}+q\Delta) + d_q \sin(q\phi_{cc}+q\Delta)] \tag{91}$$

$$y_{cc} = y_0 + a(1+m)\sin(\phi_{cc}) + a(1+m)\Sigma_{q=2}^{\infty}[c_q \cos(q\phi_{cc}-q\pi/2) + d_q \sin(q\phi_{cc}+q\pi/2)] \tag{92}$$

must be equated to the corresponding Fourier expansions $$x_{cc} = XR_0 + \Sigma_{q=1}^{\infty}[XR_q \cos(q\phi_{cc}) + XI_q \sin(q\phi_{cc})] \tag{93}$$

$$y_{cc} = YR_0 + \Sigma_{q=1}^{\infty}[YR_q \cos(q\phi_{cc}) + YI_q \sin(q\phi_{cc})] \tag{94}$$

In this case, the assignment of the Fourier coefficients $XR_q$, $XI_q$, $YR_q$, $YI_q$ to the correction values $c_q$, $d_q$ can be made simply and uniquely. However, the principle of the approach, that is in particular the manner in which the Fourier coefficients $XR_q$, $XI_q$, $YR_q$, $YI_q$ are determined, the adjustment of the correction values $x_0$, $y_0$, $m$, $\Delta$, $c_q$ and $d_q$ by reference to the Fourier coefficients $XR_q$, $XI_q$, $YR_q$, $YI_q$ which have been determined, and the determination of the corrected signals $x_{cc}$, $y_{cc}$ by reference to the measuring signals $x$, $y$ and the correction values $x_0$, $y_0$, $m$, $\Delta$, $c_q$, $d_q$, is just as previously described for the supplementary signal $r_{cc}$.

In particular cases, there may be small differences between the correction values $c_q$, $d_q$ determined by evaluation of the equations 91 and 93 on the one hand and 92 and 94 on the other. For this reason it is preferable, as shown in FIG. 13, to determine the Fourier coefficients $XR_q$, $XI_q$, $YR_q$, $YI_q$ for both corrected signals $x_{cc}$, $y_{cc}$. In this case, the correction values $c_q$, $d_q$ for the higher-frequency waves in the measuring signals $x$, $y$ will be adjusted using the Fourier coefficients $XR_q$, $XI_q$, $YR_q$, $YI_q$ for both corrected signals $x_{cc}$, $y_{cc}$. In particular, mean values can be formed.

Unlike the sums of the squares of the corrected signals $x_{cc}$, $y_{cc}$, the corrected signals $x_{cc}$, $y_{cc}$ themselves show a marked fluctuation at the basic frequency fG. It can be logical therefore to begin by using the arctangent $\phi_{cc}$ and the amplitude a to determine expected signals $x'$, $y'$ according to the equations $$x' = a \cos \phi_{cc} \text{ and} \tag{95}$$

$$y' = a \sin \phi_{cc} \tag{96}$$

and to subtract these expected signals $x'$, $y'$ from the corresponding measuring signals $x$, $y$. That is to say, in this case supplementary signals $\delta x$, $\delta y$ are formed, corresponding to the difference between the measuring signals $x$, $y$ and the expected signals $x'$, $y'$. The correction values $x_0$, $y_0$, $m$, $\Delta$, $c_q$, $d_q$ are in this case adjusted using the Fourier coefficients of the supplementary signals $\delta x$, $\delta y$.

By means of the approach in accordance with the invention it is thus also possible to correct higher-frequency waves in the measuring signals $x$, $y$ in a simple manner.

The invention claimed is:

1. A determination method for correcting errors in a position signal, comprising:
    scanning a measuring scale having a plurality of equally-spaced scale divisions by at least two sensors which are moveable relative to the measuring scale;
    supplying measuring signals based upon the scanning, wherein the measuring signals:
        are periodic for a uniform relative movement of the measuring scale,
        have essentially the same amplitude,
        are essentially sinusoidal,
        have a phase offset relative to one another which is essentially 90°, and
        have a basic frequency which corresponds with the relative movement of the measuring scale, and during the course of one period of the measuring signals, the measuring scale executes a relative movement of one scale division;
    determining corrected signals from the measuring signals based upon correction values;
    determining a position signal of the measuring scale relative to the sensors based upon the corrected signals;
    determining Fourier coefficients for a supplementary signal based upon the basic frequency, wherein the supplementary signal is equal to a sum of squares of the corrected signals or a value derived from this sum; and
    adjusting the correction values based upon the Fourier coefficients;
    wherein the correction values are based upon a value selected from the group consisting of:
        at least two offset correction values,
        at least one amplitude correction value,
        at least one phase correction value for the measuring signals and
        combinations thereof,
        together with at least one correction value for at least one higher-frequency wave in the measuring signals.

2. The determination method as claimed in claim 1, wherein the correction values for the at least one higher-frequency wave in the measuring signal is determined only for higher-frequency waves in the measuring signal which have a frequency which is an odd number multiple of the basic frequency.

3. The determination method as claimed in claim 2, wherein the correction values are determined only for the higher-frequency waves in the measuring signal, the higher-frequency being three or five times the basic frequency, wherein further the correction values for the higher-frequency waves in the measuring signals which have a frequency of five times the basic frequency have a predetermined ratio to the correction values for the higher-frequency waves in the measuring signals, which have a frequency three times the basic frequency.

4. The determination method as claimed in claim 3, wherein the correction values are determined only for the higher-frequency waves in the measuring signal which have a frequency which is three times the basic frequency.

5. The determination method as claimed in claim 1, further comprising:
saving the supplementary signal in at least one register which has an assigned angular range,
using the saved supplementary signal to determine the Fourier coefficients,
saving the supplementary signal in the register whose angular range lies in the arctangent of the corrected signals, and
determining the Fourier coefficients based upon the values saved into the registers.

6. The determination method as claimed in claim 1, wherein a plurality of registers and an angular range is assigned to each register.

7. The determination method as claimed in claim 6, wherein after the determination of the Fourier coefficients the values saved into the registers are deleted and a re-determination of the Fourier coefficients will only be undertaken again after the registers have been filled sufficiently.

8. The determination method as claimed in claim 7, wherein the registers are filled when values have been saved into a first group of the registers, and a second group of the registers are filled with values which are determined by reference to the values saved.

9. The determination method as claimed in claim 5, wherein registers are assigned to each Fourier coefficient and the Fourier coefficient is determined only based upon the values which are saved in the registers assigned to the Fourier coefficient.

10. The determination method as claimed in claim 9, wherein the Fourier coefficients are determined by forming sums and differences of the values saved in the assigned registers.

11. The determination method as claimed in claim 1, further comprising:
determining pre-corrected signals
determining pre-corrected signals based upon:
the measuring signals, and
a value selected from the group consisting of:
the offset correction value,
the at least one amplitude correction value,
the at least one phase correction value, and
combinations thereof
determining the corrected signals based upon the pre-corrected signals and to the at least one correction value for the one or more higher-frequency waves in the measuring signals.

12. The determination method as claimed in claim 11, further comprising:
determining a preliminary arctangent based upon the pre-corrected signals, and
determining the corrected signals applying the preliminary arctangent as the argument in a Fourier series expansion.

13. The determination method as claimed in claim 12, wherein the corrected signals are determined based upon the pre-corrected signals by the formation of functions of the form $$x_{cc} = x_c - a\sum_{q=2}^{\infty}[c_q\cos(q\varphi_c) + d_q\sin(q\varphi_c)]$$

and $$y_{cc} = y_c - a\sum_{q=2}^{\infty}[c_q\cos(q\varphi_c - q^\pi/2) + d_q\sin(q\varphi_c - q^\pi/2)]$$

where:
$x_{cc}$ and $y_{cc}$ are the corrected signals,
$x_c$ and $y_c$ are the pre-corrected signals,
a is the signal amplitude,
$c_q$ and $d_q$ are weighting factors determined based upon the Fourier coefficients,
and
$\phi_c$ is the preliminary arctangent.

14. The determination method as claimed in claim 13, wherein in the formula $$y_{cc} = y_c - a\sum_{q=2}^{\infty}[c_q\cos(q\varphi_c - q^\pi/2) + d_q\sin(q\varphi_c - q^\pi/2)]$$

the expression $\cos(q\phi_c - q\pi/2)$ is replaced by $\cos(q\phi_c)$ for $q=0, 4, 8, \ldots$, by $\sin(q\phi_c)$ for $q=1, 5, 9, \ldots$, by $-\cos(q\phi_c)$ for $q=2, 6, 10, \ldots$, and by $-\sin(q\phi_c)$ for $q=3, 7, 11, \ldots$.

and the expression $\sin(q\phi_c - q\pi/2)$ is replaced by $\sin(q\phi_c)$ for $q=0, 4, 8, \ldots$, by $-\cos(q\phi_c)$ for $q=1, 5, 9, \ldots$, by $-\sin(q\phi_c)$ for $q=2, 6, 10, \ldots$, and by $\cos(q\phi_c)$ for $q=3, 7, 11, \ldots$.

15. The determination method as claimed in claim 12, wherein the corrected signals are determined based upon the pre-corrected signals by the formation of functions of the form $$x_{cc} = x_c - a\sum_{q=2}^{\infty}[c_q z_3 + d_q z_4]$$

and $$y_{cc} = y_c - a\sum_{q=2}^{\infty}[c_q z_1 + d_q z_2]$$

where:
- $x_{cc}$ and $y_{cc}$ are the corrected signals,
- $x_c$ and $y_c$ are the pre-corrected signals,
- a is the signal amplitude,
- $c_q$ and $d_q$ are weighting factors determined based upon the Fourier coefficients,
- $\phi_c$ is the preliminary arctangent
- $z_1$ is $z_3$ for q=0, 4, 8, ..., $z_4$ for q=1, 5, 9, ..., $-z_3$ for $q$=2, 6, 10, ..., and $-z_4$ for $q$=3, 7, 11, ...,

- $z_2$ is $z_4$ for $q = 0, 4, 8, \ldots$, $-z_3$ for $q = 1, 5, 9, \ldots$, $-z_4$ for $q = 2, 6, 10, \ldots$, and $z_3$ for $q = 3, 7, 11, \ldots$, $$z_3 = \sum_{r=0}^{int(q/2)} (-1)^r \binom{q}{2r} (\cos\varphi_c)^{q-2r}(\sin\varphi_c)^{2r}, \text{ and}$$

$$z_4 = \sum_{r=0}^{int[(q-1)/2]} (-1)^r \binom{q}{2r+1} (\cos\varphi_c)^{q-2r-1}(\sin\varphi_c)^{2r+1}.$$

16. The determination method as claimed in claim 12, wherein the corrected signals are determined based upon the pre-corrected signals by the formation of functions of the form $$x_{cc} = x_c - a\sum_{q=2}^{\infty} [c_q z_3 + d_q z_4]$$

and $$y_{cc} = y_c - a\sum_{q=2}^{\infty} [c_q z_1 + d_q z_2]$$

where:
- $x_{cc}$ and $y_{cc}$ are the corrected signals,
- $x_c$ and $y_c$ are the pre-corrected signals,
- a is the signal amplitude,
- $c_q$ and $d_q$ are weighting factors determined based upon the Fourier coefficients,
- $\phi_c$ is the preliminary arctangent
- $z_1$ is $z_3$ for q=0, 4, 8, ..., $z_4$ for q=1, 5, 9, ..., $-z_3$ for $q$=2, 6, 10, ..., and $-z_4$ for $q$=3, 7, 11, ...,

- $z_2$ is $z_4$ for $q = 0, 4, 8, \ldots$, $-z_3$ for $q = 1, 5, 9, \ldots$, $-z_4$ for $q = 2, 6, 10, \ldots$, and $z_3$ for $q = 3, 7, 11, \ldots$, $$z_3 = \sum_{r=0}^{int(q/2)} (-1)^r \binom{q}{2r} (x_c/a)^{q-2r}(y_c/a)^{2r}, \text{ and}$$

$$z_4 = \sum_{r=0}^{int[(q-1)/2]} (-1)^r \binom{q}{2r+1} (x_c/a)^{q-2r-1}(y_c/a)^{2r+1}.$$

17. The determination method as claimed in claim 11, wherein the corrected signals are determined based upon the pre-corrected signals, by the formation of functions of the form $$x_{cc} = x_c - \sum_{q=2}^{\infty} b_q x_c^q$$

and $$y_{cc} = y_c - \sum_{q=2}^{\infty} b_q y_c^q$$

where $x_{cc}$ and $y_{cc}$ are the corrected signals and $x_c$ and $y_c$ the pre-corrected signals, and $b_q$ a weighting factor.

* * * * *